UNITED STATES PATENT OFFICE.

OSKAR UNGER AND EUGEN MOLINEUS, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING QUINIZARIN.

1,087,412.      Specification of Letters Patent.      Patented Feb. 17, 1914.

No Drawing.      Application filed October 8, 1912. Serial No. 724,612.

*To all whom it may concern:*

Be it known that we, OSKAR UNGER and EUGEN MOLINEUS, doctors of philosophy, chemists, citizens of the German Empire, residing at Leverkusen, near Cologne, Germany, have invented new and useful Improvements in Processes of Producing Quinizarin, of which the following is a specification.

We have found that quinizarin can be obtained with a good yield by condensing parachlorophenol compounds such as para-chlorophenol or its sulfonic acids with phthalic anhydrid by means of concentrated or fuming sulfuric acid containing boric acid.

In order to illustrate the new process more fully the following examples are given, the parts being by weight:

Example 1: 80 parts of phthalic anhydrid, 20 parts of boric acid and 23 parts of para-chlorophenol are added to 400 parts of sulfuric acid (96 per cent.). The mixture is heated for 3 hours to 150° C., the temperature is then raised to from 180 to 200° C. and kept at this point until the amount of quinizarin does not further increase. The melt is after cooling poured into 20 times the quantity of water, the precipitate which separates is collected on a filter then purified by extraction with a large quantity of boiling water and finally dried. The yield of quinizarin amounts to 70–80 per cent. of the theory.

Example 2: A mixture of 60 parts of para-chlorophenol with 200 parts of fuming sulfuric acid (20 per cent.) is heated to from 130–140° C. and kept at this temperature until a test portion does not separate any more precipitate, when added to a 12 per cent. solution of common salt, which indicates the complete formation of the disulfonic acid of para-chlorophenol. 200 parts of sulfuric acid (96 per cent.), 40 parts of boric acid and 80 parts of phthalic anhydrid are then added to the melt and the mixture is heated as described in Example 1. After some time the sulfuric-boric-acid-ester having most probably the formula:

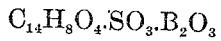
$$C_{14}H_8O_4.SO_3.B_2O_3$$

separates from the melt in dark blue crystals. When its amount does not further increase, the melt is allowed to cool and the precipitate is collected on an asbestos filter then washed with sulfuric acid (60° Bé.) finally with ice water and is then dried. On boiling it with water or a solution of soda quinizarin is obtained of excellent purity.

Example 3: 112 parts of the sodium salt of 4-chlorophenol-2-monosulfonic acid, 80 parts of phthalic anhydrid and 20 parts of boric acid are heated with 400 parts of sulfuric acid monohydrate as described in the preceding examples. The yield of quinizarin is equal to the amount obtained when using the equimolecular quantity of para-chloro-phenol.

We claim:—

1. Process for producing quinizarin, which process comprises condensing a para-chlorophenol compound with phthalic acid anhydrid by means of sulfuric acid containing boric acid, substantially as described.

2. Process for producing quinizarin, which process comprises condensing a para-chloro-phenol sulfonic acid with phthalic acid anhydrid by means of sulfuric acid containing boric acid, substantially as described.

3. Process for producing quinizarin, which process comprises condensing a para-chloro-phenol compound with phthalic acid anhydrid by means of concentrated sulfuric acid containing boric acid, substantially as described.

4. Process for producing quinizarin, which process comprises condensing a para-chloro-phenol sulfonic acid with phthalic acid anhydrid by means of concentrated sulfuric acid containing boric acid, substantially as described.

5. Process for producing quinizarin, which process comprises condensing a para-chloro-phenol compound with phthalic acid anhydrid by means of fuming sulfuric acid containing boric acid, substantially as described.

6. Process for producing quinizarin, which process comprises condensing a para-chloro-phenol sulfonic acid with phthalic acid anhydrid by means of fuming sulfuric acid containing boric acid, substantially as described.

In testimony whereof we have hereunto set our hands in the presence of two subscribing witnesses.

OSKAR UNGER. [L. S.]
EUGEN MOLINEUS. [L. S.]

Witnesses:
CHAS. J. WRIGHT,
ALBERT NUFER.